United States Patent [19]
Fong et al.

[11] 3,761,753
[45] Sept. 25, 1973

[54] ROTARY ELECTRIC MACHINES
[75] Inventors: William Fong, Westbury-on-Trym, Bristol; Gordon Hindle Rawcliffe, Bristol, both of England
[73] Assignee: National Research Development Corporation, London, England
[22] Filed: Feb. 18, 1972
[21] Appl. No.: 227,548

[30] Foreign Application Priority Data
March 12, 1971 Great Britain................06698/71

[52] U.S. Cl................. 310/185, 310/198, 318/224, 318/225
[51] Int. Cl. ............................................ H02k 1/14
[58] Field of Search........................... 318/224, 225; 310/184, 185, 198

[56] References Cited
UNITED STATES PATENTS
3,440,510   4/1969   Canadelli....................... 318/224 R Primary Examiner—J. D. Miller
Assistant Examiner—H. Huberfeld
Attorney—Larson et al.

[57] ABSTRACT

A single-phase alternating current capacitor-start electric motor with a stator winding wound as two components spaced 90±N° electrically, where N is a small angle but never zero. Both components are energised for running. For starting, one component is energised serially with a capacitor to provide starting torque.

Phase reversal of one component reverses the direction of rotation.

7 Claims, 5 Drawing Figures

ROTARY ELECTRIC MACHINES

This invention relates to rotary electric machines, particularly to single-phase capacitor-start electric motors.

The conventional single-phase capacitor start electric motor has two stator windings, the main winding and the auxiliary winding, both of graded concentric type and one having its axis displaced 90° electrically relatively to the other. Only the main winding is energised during running. The auxiliary winding is energised to provide a starting torque only. Commonly, all the stator coils are graded according to sine laws, giving a winding factor of about 0.78.

The object of the present invention is to provide an improved capacitor-start motor in which the whole of the stator winding is energised during running and no winding part is provided solely to provide starting torque.

Accordingly, a single-phase, alternating current, capacitor-start electric motor comprises a stator winding which is energised during the running condition of the motor, said stator winding being wound as first and second winding components said components being electrically spaced at an angle of 90± N °, where N is a small angle but never zero, and has switch means for energising both components during running and for energising the first components as main winding and the second component serially with a capacitor to provide starting torque, during starting.

In order that the invention may be readily carried into practice, the prior art and two embodiments of the invention will now be described, by way of example, with reference to the accompanying drawings, in which.

Figure 1:
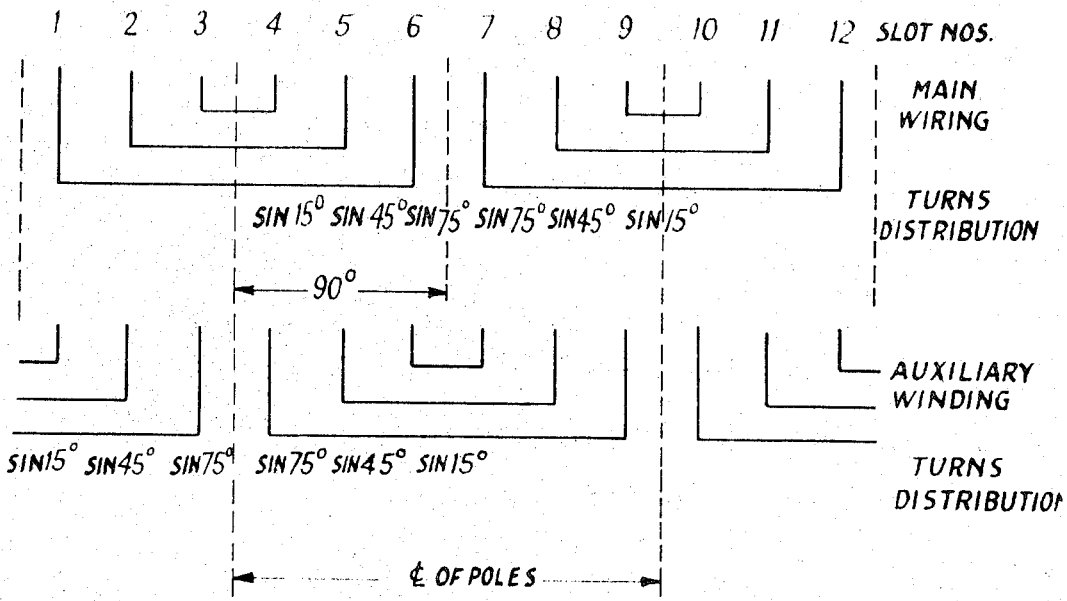
FIG. 1 is a winding diagram representing a standard sinusoidally-distributed 2-pole concentrically wound stator winding in a 12-slot frame for a known single-phase capacitor-start motor.
Figure 2:
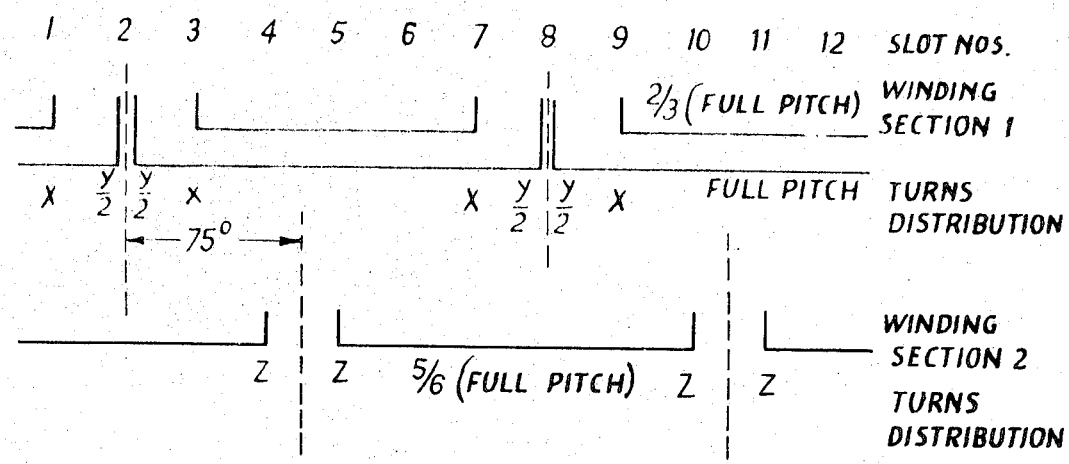
FIG. 2 shows similarly a stator winding arrangement in a 12-slot frame for a 2-pole capacitor start motor according to the invention.

In the winding diagrams of FIGS. 1 and 2, the row of numbers at the head of the diagram represent the slot numbers of a 12-slot frame of a 2-pole motor. Equally they may represent 12 successive slots of a 2 P-pole motor wound on a 12 P-slot frame. The full lines represent the coils of each concentric winding and the terms below represent the turns distribution for each coil.

A conventional capacitor-start motor has a winding as shown in FIG. 1. The auxiliary winding normally has fewer series turns than the main winding and is wound with wire of much smaller size, although it is possible to use more turns and very thin wire. The ratios $(t_a/t_m)$ and $(A_a/A_m)$ are respectively normally of the orders 0.6 and 0.4, or larger, where:

$t$ is the turns-number in series $A$ is the conductor cross-section and the suffices $a$ and $m$ refer respectively to the auxiliary and main windings.

The choice of $(t_a/t_m)$ has a great influence on the accelerating characteristic for any given value of starting capacitor. For a small value of $(t_a/t_m)$, the starting torque is low, but the motor is capable of producing high torque at higher speeds. For a large value of $(t_a/t_m)$, on the other hand, the torque is high at starting, but drops rapidly as the motor gains speed.

The auxiliary winding is connected to the supply for part of the run-up period, and is then disconnected by the action of a centrifugal switch. From the view points both of copper utilisation and of labour cost in manufacture, the auxiliary winding is undesirable. Also, burn-out of the auxiliary winding is common, as a result of stalling or too frequent starting, because of the very high current-density in this winding.

The total copper in use in the running connection, compared with the total copper contained in the machine is $$(t_m A_m)/(t_m A_m + t_a A_a).$$

Since $(t_a A_a)/(t_m A_m) = 0.24$ or more, the copper utilisation factor when running is $(1)/(1 + 0.24) = 0.806$ or less. The winding factor is about 0.78. The effective copper utilisation factor of the copper in the machine when running is $0.806 \times 0.78 = 0.63$, or less.

There is a further disadvantage in that part of the space available in the motor is not filled with windings of any kind.

In slots 4, 5 and 6 of FIG. 1, for example, the total conductor-loadings for both main and starting windings are proportional to $$t_a A_a \sin 75° + t_m A_a \sin 15°$$
$$t_a A_a \sin 45° + t_m A_a \sin 45°$$

and $$t_a A_a \sin 15° + t_m A_a \sin 75°$$

Taking the ratio $(t_a A_a/t_m A_m)$ as 0.24, the loadings of slots 4, 5 and 6 are theoretically proportional to:

$$0.491 : 0.877 : 1.028 \ t_m A_m$$

or $$0.475 : 0.853 : 1.000 \ t_m A_m$$

On average, therefore, about 0.776 of the total available slot-space is used. In practice, the slot-sizes may be graded, and some of the marginal space can then be used for fixing the core, etc., but the above equations necessarily represent some inherent waste of space, whether or not uniform slotting is adopted.

In fact, the effective utilisation of the space available in the motor, when it is running, is:

Slot-filling factor $\times$ Proportion used for running winding $\times$ (Winding factor)

$$(0.776) \times (0.806) \times (0.78) = 0.49.$$

The effective utilisation factor of the copper in the machine is 0.63, or less, as shown above.

These are the standards by which a winding according to the present invention must be judged. It is emphasised that the numerical values assumed above are on the favourable side for the conventional motor. In practice, the conventional motor is usually less satisfactory than the assumed figures indicate.

A stator winding for a capacitor-start motor according to the present invention is shown in FIG. 2. This motor is wound in a manner similar to a conventional motor, except that the main winding is grouped so as to give two winding sections, shown as Section 1 and Section 2, displaced by 75° electrical from each other. Winding section 1 is composed of two identical groups of concentric coils; the inner and outer coils of each group having $x$ and $Y/2$ turns, respectively. Winding section 2 has two coils of $z$ turns each. All the coils of each section are normally connection in series.

The Sections 1 and 2 are connected in series to form the running winding. Thus, there is no part of the winding which is not used in normal operation.

Figure 3:
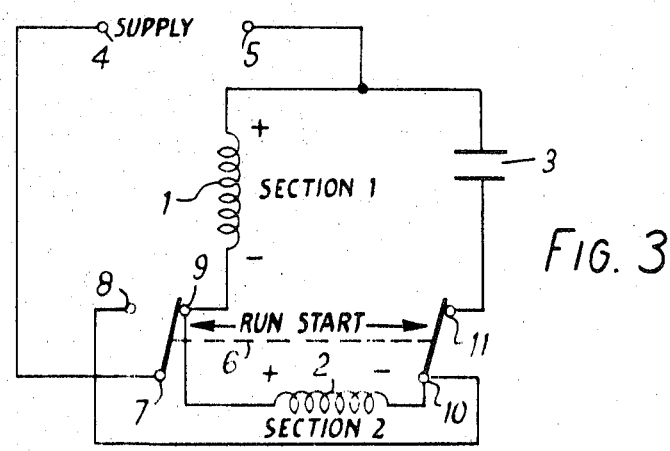
FIG. 3 is a circuit diagram showing switching means for starting and running the motor of FIG. 2.

The switching means to change from the 'Start' condition to the 'Run' condition are shown in FIG. 3. FIG. 3 shows the circuit arrangement when, as stated above, Sections 1 and 2 are displaced by 75° electrical.

Figure 4:
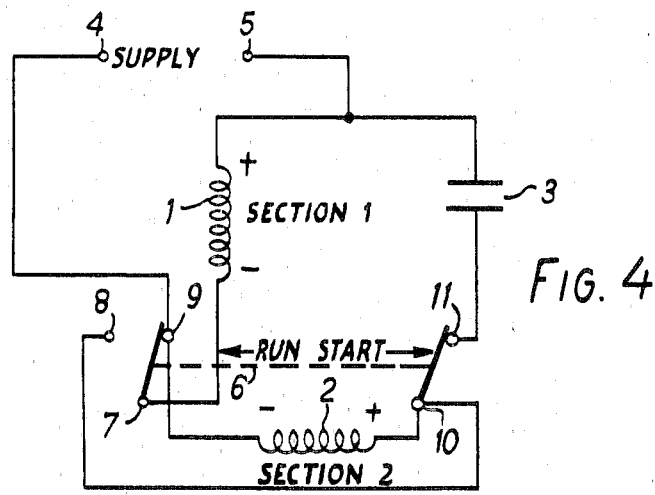
FIG. 4 shows the switching means for an alternative stator winding arrangement.

In an alternative arrangement, Sections 1 and 2 are displaced by 105° electrical and the switching means for this variant are shown in FIG. 4.

In FIGS. 3 and 4, like elements are indicated by the same reference numbers. Thus, Section 1 and Section 2 of the winding of FIG. 2 are indicated at 1 and 2, respectively. A starting capacitor 3 is permanently connected to one end of winding section 1 and the junction is connected to terminal 5 of a pair of supply terminals 4, 5. The switching means 6 comprises ganged switches, one having a contact 7 which is connected alternatively to contacts 8 and 9, the other having a contact 10 which is alternatively open circuit and connected to a contact 11, respectively.

Contact 8 is connected to contact 10 and to one end of winding section 2. The free terminal of capacitor 3 is connected to terminal 11.

In the arrangement of FIG. 3, the other end of winding section 1 is connected to terminal 7 and the other end of winding section 2 is connected to terminal 9. Supply terminal 4 is connected to switch terminal 9.

In the arrangement of FIG. 4, the other end of winding section 1 is connected to terminal 9 together with the other end of winding section 2. Supply terminal 4 is connected to switch terminal 7.

For the arrangements of both FIG. 3 and FIG. 4, for the starting condition, terminals 7 and 9 are connected together and terminals 10 and 11 are connected together. For the running condition, terminals 7 and 8 are connected together and the capacitor 3 is disconnected by opening terminals 10 and 11.

Considering, again, the winding of FIG. 2, for uniform current-loading in the slots, in normal operation, $x = y = z = 1$ (say); and the total actual number of turns in the machine thus is $(y + 2x + 2z) = 5$. It can then be shown that the total effective number of turns in the whole winding, in normal operation, is given by: $(\sqrt{3} + 1) (1.366) = 3.73$; and the operative winding factor is thus $(3.73/5) = 0.746$.

Five slots out of six are thus fully wound, and every sixth slot is unused. The slot-filling factor is therefore 0.833, and the proportion of the winding used in normal running is 1.00.

The effective utilisation of the space available in the motor, when it is running, is:

$$\begin{pmatrix}\text{Slot-filling}\\\text{factor}\end{pmatrix} \times \begin{pmatrix}\text{Proportion used for}\\\text{running winding}\end{pmatrix} \times \begin{pmatrix}\text{Winding}\\\text{factor}\end{pmatrix}$$

$(0.833) \times (1.00) \times (0.746) = 0.62.$

The effective utilisation of the copper is 0.746.

These figures correspond to the figures for the conventional winding of FIG. 1, (0.49 and 0.63) calculated on the same basis.

The space utilisation is greater in the ratio $(62/49) = 1.26$ and the copper utilisation in the ratio $(746/630) = 1.18$. On any basis, there is a gain of about 20 percent in utilisation. Manufacture is simpler and the reliability of the starting winding is greater. This is a substantial group of advantages.

The conductor distribution over the pole-pitch (six slots) is $x : x : x : x : x : o$.

For quantity production, one slot in six need not be punched. This could provide some space for core-fixing etc. if required.

The 2-pole example is chosen only for simplicity, but it can readily be doubled, trebled etc. for 4-pole, 6-pole machines etc.

In an alternative form of the winding, the second section of the winding of FIG. 2 is placed in slots 5 and 6 instead of 4 and 5. The angle of electrical displacement between winding section 1 and winding section 2 is thereby changed from 75° to 105°, and the torque characteristic is improved, as will be seen from the description given later with reference to FIG. 5.

The switching arrangement for this embodiment has been described with reference to FIG. 4.

A motor according to the present invention thus has two torque characteristics: one for each direction of rotation. The two characteristics can be interchanged by change of coil-position; or by reversal of the interconnection between the two sections of the winding, as shown in FIGS. 3 and 4. The latter reversal can, of course, be very readily carried out on an existing motor: the choice of coil-position has to be made in manufacture.

A particular design position of the second winding section gives one particular direction of rotation for one direction of the interconnection between the two sections, and the other direction of rotation for the opposite direction of interconnection. For the other design position, each of these directions of rotation is reversed.

The basic reason for there being two alternative torque characteristics in the starting regime is that there is mutual induction between the two sections of the winding, since they are not at 90° electrical spacing. The value of mutual induction will obviously be affected by the relative positions of the sections and by their relative direction of interconnection. The running torque characteristic is, of course, always the same.

Figure 5:
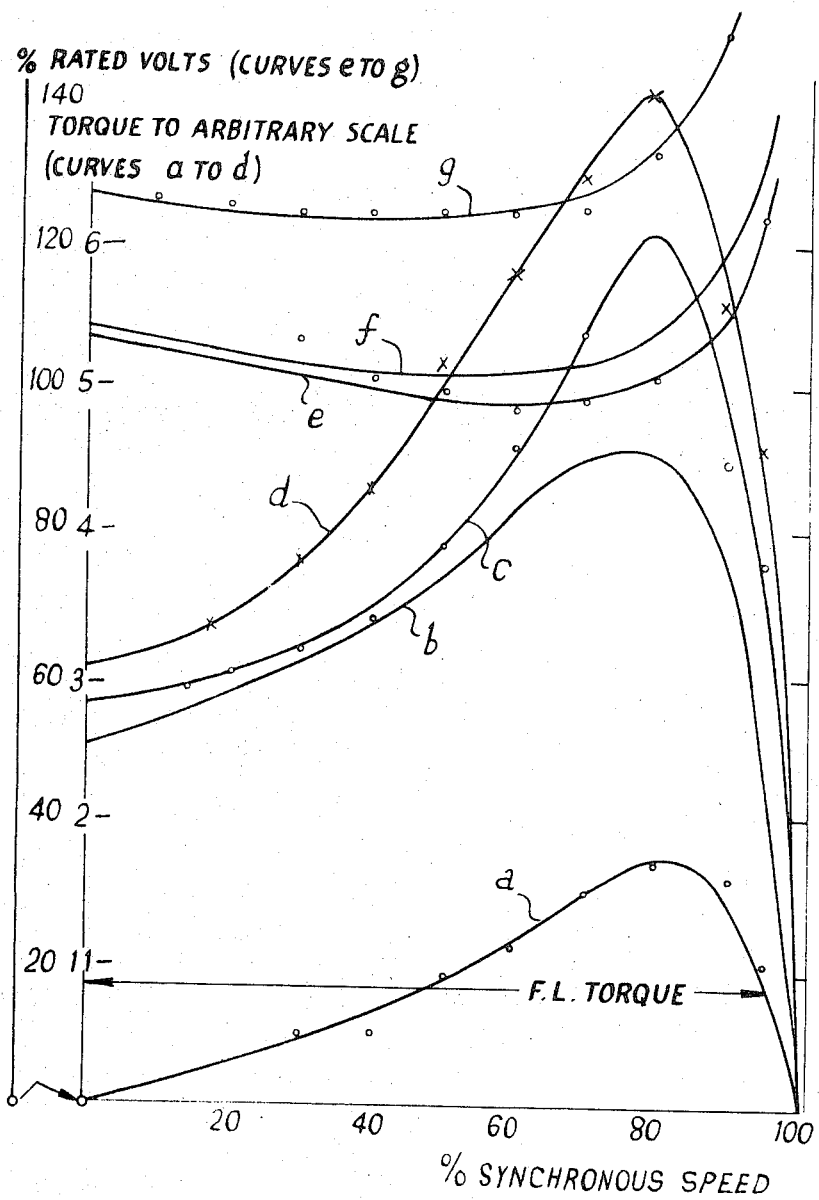
FIG. 5 shows a series of curves indicating comparative torque performance of conventional single-phase capacitorstart motors and of motors according to the invention.

FIG. 5 shows the torque/speed and capacitor-voltage/speed curves of a conventional capacitor-start motor and one wound with a new type of winding in an identical frame; the same starting capacitor being used for both machines.

The main winding (only) of the conventional motor has the same number of effective series turns as the two sections of the new winding in series. For the same supply voltage, the torque/speed curves of the conventional motor (using only the main winding) and the new motor (using the whole winding in the running connection) are therefore identical and are as given in FIG. 5, Curve a. Neither of these motors have, of course, any inherent starting torque in this connection.

FIG. 5, Curve b shows the torque-speed curve of the conventional motor with both main and auxiliary windings in circuit; the value of the starting capacitor being chosen to give a ratio of 3:1 between the starting and full-load torques.

Curves c and d respectively show the torque/speed relationship of the new motor, with 75° and with 105° displacement, between the two winding sections respectively, using the same value of starting capacitor as for the conventional motor. Curve c was obtained for the condition when the axes of winding sections 1 and 2 are displaced 75° as shown in FIG. 2, and Curve d was taken with winding section 2 reversed with respect to winding section 1. This means that the spacing between the two winding sections was changed to (180° − 75°) = 105°. As is shown, the torque characteristic is thereby substantially improved. In addition, the direction of rotation is reversed.

Even the less favourable torque characteristic, Curve c, is appreciably superior to the characteristics of the conventional machine, Curve b. Curve d is better by an order of magnitude.

For extra high torque operation, in one direction the design would be based on 105° spacing. For reversing service, it wound be necessary to decide whether the torque duty in one direction was less arduous than for the other direction.

The voltages on the capacitor, as the speed rises, are shown in FIG. 5, by Curves e, f and g. For 75° displacement between winding sections, Curve e, it is at all points lower than for a conventional motor Curve f. For 105° displacement, Curve g, the voltage rises about 15 to 20 percent; and, in principle, this is not desirable. In practice, it is unlikely that any capacitor used with a conventional motor will be so closely rated that this modest increase of voltage will not be acceptable.

The only disadvantage, for improved torque characteristics and more economic use of both space and copper, is that the starting switch is slightly more complicated than for a conventional motor, as shown in FIGS. 3 and 4.

The winding described with reference to FIG. 2 is purely by way of example. The general principle is that it is possible to divide a 'single-phase' winding into two component sections; and to switch them so that, while starting, one section of this winding acts as the main winding, and the other section as the starting winding. When the machine is nearly up to speed, the two sections are combined to form the operating winding. A variety of embodiments of this new principle are practicable, but it is believed that the one described is one of the simplest. Different slot-numbers, different coil-groupings for the two winding sections, and different turns-numbers for the individual coils will give a variety of performance characteristics.

We claim:

1. A single-phase, alternating current, capacitor-start electric motor comprising a stator winding which is energised during the running condition of the motor, said stator winding being wound as first and second winding components said components being electrically spaced at an angle of 90± N degrees, where N is a small angle but never zero, and having switch means for energising both components during running and for energising the first component as main winding and the second component serially with a capacitor to provide starting torque, during starting.

2. An electric motor as claimed in claim 1, for P poles, where P is an even number in which the first winding component comprises P coils of full pitch, conductors of adjacent such coils sharing a common slot, together with P concentric coils of less than full pitch and the second winding component comprises P coils of less than full pitch.

3. An electric motor as claimed in claim 2, wound on a 6P slot frame, in a sequence of 12 slots whereof said full pitch coils extend from slot 2 to slot 8, the further coils of the first winding component extend from slot 3 to slot 7, the coils of the second winding component extend from slot 5 to slot 10, and slot 11 to slot 4, and slots 6 and 12 are unoccupied.

4. An electric motor as claimed in claim 2, wound on a 6P slot frame, in a sequence of twelve slots whereof said full pitch coils extend from slot 2 to slot 8, the further coils of the first winding component extend from slot 3 to slot 7, the coils of the second winding component extend from slot 6 to slot 11, and slot 12 to slot 5, and slots 4 and 10 are unoccupied.

5. An electric motor as claimed in claim 4, in the frame of which every 6th slot is not punched.

6. An electric motor as claimed in claim 1, in which the first and second winding components are electrically spaced at an angle of 90± 15°.

7. An electric motor as claimed in claim 2, in which the full pitch coils are wound with one-half the number of turns of each of the coils of less than full pitch.

* * * * *